United States Patent [19]

Fishe

[11] 4,281,626
[45] Aug. 4, 1981

[54] VAPORIZABLE LIQUID INJECTION SYSTEM AND METHOD FOR INTERNAL COMBUSTION ENGINE

[76] Inventor: Gerald R. A. Fishe, 404 N. Andrews Ave., Fort Lauderdale, Fla. 33301

[21] Appl. No.: 34,265

[22] Filed: Apr. 30, 1979

[51] Int. Cl.³ .......................................... F02M 25/02
[52] U.S. Cl. ................................ 123/25 C; 123/25 P
[58] Field of Search ................. 123/25 C, 25 B, 25 D, 123/25 P

[56] References Cited

U.S. PATENT DOCUMENTS

| | | | |
|---|---|---|---|
| 885,820 | 4/1908 | Winand et al. | 123/25 C X |
| 1,261,779 | 4/1918 | Dempsey | 123/25 C |
| 1,555,991 | 10/1925 | Konar | 123/75 B |
| 1,835,971 | 12/1931 | Schattanek | 123/25 C X |
| 2,352,267 | 6/1944 | Kelsey | 123/25 C |
| 2,777,430 | 1/1957 | Meurer | 123/25 C |
| 3,672,341 | 6/1972 | Smith et al. | 123/25 C X |
| 3,908,613 | 9/1975 | Loby | 123/25 C |
| 3,990,408 | 11/1976 | Kroll | 123/25 C |
| 4,098,231 | 7/1978 | Davis et al. | 123/25 B |
| 4,122,803 | 10/1978 | Miller | 123/25 C X |

*Primary Examiner*—Tony M. Argenbright
*Attorney, Agent, or Firm*—Oltman and Flynn

[57] ABSTRACT

A four or two cycle internal combustion engine is provided with a device for introducing evaporable liquid into a cylinder of the engine in a manner such that the evaporable liquid is contacted by the gases being compressed during compression phase, is separated, segregated or concealed during most of the combustion phase, and exposed and contacted by the combusting fuel gases primarily after most of the combustion of the fuel gases has occurred for absorbing some of the heat of combustion in the liquid and vaporizing the liquid. The invention is useful both for construction of new Otto or Diesel cycle internal combustion engines, and modification of existing engines.

8 Claims, 16 Drawing Figures

STEP 1 — INTAKE MOISTURE
STEP 2 — INTAKE GAS & AIR
STEP 3 — COMPRESION
STEP 4 — IGNITION
STEP 5 — EXPANSION
STEP 6 — EXHAUST

VAPORIZABLE LIQUID INJECTION SYSTEM AND METHOD FOR INTERNAL COMBUSTION ENGINE

BACKGROUND OF THE INVENTION

It is known that the power output of an internal combustion engine and its fuel utilization efficiency can be increased by introducing a quantity of liquid into the combustion chamber. Examples of prior art in this field are described in the following U.S. Pat. Nos.

4,004,554—Kosaka et al;
3,990,408—Kroll
3,908,613—Loby
2,352,267—Kelsey;
2,777,430—Maurer
3,672,341—Smith Known systems have not provided the most effective devices for transferring heat of compression and combustion to the liquid which is introduced into the cylinder of the engine and most effective utilization of the evaporation of the liquid in the conversion of fuel energy into mechanical work energy. For instance, if evaporable liquid is introduced to the cylinder with, and mixed completely with, the fuel-air mixture, the evaporation of the liquid tends to reduce the combustion temperature too much and results in partial oxidation of fuel with consequent reduction in conversion of chemical fuel energy, e.g. reduced fuel utilization efficiency.

Some reduction in combustion temperature, however, is desirable to reduce the formation of atmospheric pollutants. For example, at 5300° Rankine (Absolute), approximately 0.5% by volume of NO (Nitrous Oxide) is formed in combustion of fuel with chemical equilibrium in a rich fuel-air mixture. If, by supplying liquid in appropriate quantity during the compression stroke of an Otto Cycle Internal Combustion Engine, the combustion temperature is reduced to 4500° Rankine, then the chemical equilibrium production of Nitrous Oxide (NO) pollutant is reduced to 0.3% by volume. Known methodology and facilities do not include both an initial pollutant-reducing combustion temperature reduction and subsequent utilization of a portion of the energy normally lost to the engine cooling system to increase pressure on the piston during the power stroke and thereby improve overall engine efficiency. Other known systems provide liquid after or at the end of the combustion process only, or if supplied before combustion, do not segregate, stratify, separate, and/or shield the liquid from being vaporized during combustion.

SUMMARY OF THE INVENTION

In accordance with the present invention, the fuel-air, or oxidizing agent, mixture and heat vaporizable liquid, such as fog, or in form of a liquid film on a porous surface from which the liquid exudated, are stratified (the word "stratified" in this disclosure shall mean tending to be separate) in separate areas or layers so that the heat vaporizable liquid, fog-air mixture or surface film, tends not to mix with the fuel-air mixture during intake and compression portions of cycle.

During the final portion of compression, compressed air (in diesel) and fuel-air mixture in Otto Cycle engines is cooled by evaporation of a portion of introduced liquid, the addition of this vapor to cylinder contents does, but not excessively, lower the temperature of combustion.

Heat vaporizable liquid, such as water, is introduced into a cylinder of an internal combustion engine in a manner such that initially a portion of the heat vaporizable liquid, such as water, is vaporized by the heat of compression of the compression stroke, and then the remaining portion by the hot products of combustion gases, after most of the combustion of the fuel and oxidizing agents, such as air, has occurred.

Thus, the initial vaporization of the portion of the introduced liquid, which occurred during the compression portion of the engine cycle, cools the compressed products of combustion, reducing the amount of energy required for the compression. This initial evaporization, by adding vapor from the evaporable liquid, into the compression cylinder volume, decreases the volume occupied by the fuel-air mixture, resulting in an increase in the apparent compression ratio of the engine applicable to the fuel-air mixture. Also, the presence of this vapor, in with the fuel-air mixture during combustion, and its cooling of the compressed cylinder contents, reduces combustion temperature, thus significantly reducing the formation of the atmospheric pollutant $NO_x$ (Nitrous Oxide).

Then, utilizing a portion of the heat energy released from combustion of the fuel, to vaporize the vaporizable fluid (the word "fluid" in this disclosure shall mean the liquid state of a material), such as water, causes an increase in the mean effective pressure in the cylinder during the power stroke in the engine. The portion of the energy needs to be controlled to approximately equal the quantity of energy normally transmitted, lost, to engine cooling. This results in this normally wasted energy being utilized to both cool the engine and increase the pressure on the piston during the power stroke. The heat vaporizable fluid, such as water, may be introduced by itself, or it may be mixed with a leaner fuel mixture than the primary fuel mixture which is supplied to the cylinder. The introduction of heat vaporizable fluid, such as water, may be controlled by the exhaust temperature of the engine, temperature of hot engine components, temperature of other engine cooling means, or a combination of these. In a particular embodiment, heat vaporizable fluid, such as water, is introduced from a gakset device which replaces the normal head gasket of the cylinder, in the usual location for such a gasket. This location is appropriate to allow the combustion to proceed to a nearly complete status before the hot gaseous products of combustion come into contact with the heat vaporizable fluid. This particular embodiment permits applying this invention to existing internal combustion engines, without requiring major modification or machining of existing engine component parts, such as engine cylinder heads.

Another embodiment would place the porous surface, from which the liquid is introduced into the cylinder, around the top of the cylinder. This location requires that the rings on the piston(s) be located further down, away from the top surface of the piston, so that the piston rings do not contact the porous liquid introducing surface. In this embodiment, the porous surface may match the diameter of the cylinder, or may be extended by pleating or internal fins; the piston top portion may be shaped to match the shape of the porous surface with minimal clearance or may be shaped in any non-contacting or non-interfering shape, consistent with (Adequate Clearance From Surface of Liquid Film) engine compression ratio and combustion chamber shape. Another embodiment, particularly applicable to (Ford Motor Co. Programmed Combustion Process) (P.R.O.C.O.) or Texaco Controlled Combustion System (T.C.C.S.) type or internal combustion engines incorporation a swirl or rapid rotation of the fuel-air or air alone in the combustion chamber, immediately prior and/or during combustion, is locating a porous surface element around the perimeter of the "swirl chamber" in P.R.O.C.O. and T.C.C.S. engines, generally located in top of the piston. In this embodiment, the vaporizable liquid is introduced in form of minute droplets, fog, with the air or fuel-air mixture. Centrifugal forces, created by the rotation of the cylinder contents under the induced swirling action of P.R.O.C.O. and similar engines, cause the liquid droplets in the fog to move or "migrate" through the cylinder's contents toward the periphery. The final portion of the compression stroke on P.R.O.C.O. and similar engines usually accelerates the rotation of the cylinder contents by reducing the diameter of the space occupied by the contents to the diameter of the swirl chamber. This final increase in rotational speed, swirl, of the contents of the cylinder, deposits the minute droplets of the fog liquid on the porous surface, which receives and holds the liquid by capillary action. Being thus "caught and held" the liquid remains a liquid until the heat of combustion changes the state of the liquid to vapor, gas, at which time its expansion in volume and loss of capillary action, cause the vapor to leave the porous surface and mix with the products of combustion in the cylinder. Thus, the heat vaporizable liquid is available during compression, is separated, caught and held somewhat remote from initial ignition and most of the combustion of the fuel and then, exposed to heat of combustion, cools engine by absorbing amount similar part of the portion of combustion heat energy normally "lost" to engine cooling, converted to vapor, so this "lost" energy increases cylinder pressure and engine work output.

Accordingly, it is an object of the present invention to introduce heat vaporizable fluid, such as water, into a cylinder of a two or four cycle internal combustion engine in a manner such that the heat vaporizable liquid, such as water is not subject to significant vaporization during combustion, but is subject to receive heat energy by transfer or contact by the combusting fuel gases primarily after most of the combustion of the fuel gases has occurred, then absorbing some of the heat of combustion in the vaporizing of the remaining heat vaporizable fluid, such as water.

Another object of the invention is to introduce heat vaporizable fluid such as water, into a cylinder of a two or four cycle internal combustion engine in a manner such that the vaporizable fluid-air mixture, such as fog, is stratified substantially separate from the fuel-oxidizing agent, such as air mixture, adjacent to surface of the piston in the cylinder and the gaseous fuel-air mixture is stratified away from this mixture during the intake and compression strokes of the cylinder and during most of the combustion of the fuel in the cylinder. One of the possible locations for the vaporizable fluid fog to be located, is adjacent to the top surface of the piston in the cylinder and the fuel-oxidizing agent mixture would be located in the remainder of the cylinder volume. Basically, the fuel-oxidizing agent mixture located around the spark plug ignition location, and the vaporizable fluid fog stratified away from the ignition initiation location is the desired stratification arrangement.

A further object of the invention is to introduce heat vaporizable fluid, such as water, mixed with lean gaseous or liquid fuel separate from the introduction of richer gaseous or liquid fuel into the cylinder so that the lean fuel and vaporizable fluid fog mixture is substantially stratified near the surface of the piston in the cylinder separate from the richer fuel mixture at combustion in the cylinder.

A further object of the invention is to introduce vaporizable liquid, such as water, into a cylinder of an engine from a device which functions both as a gasket and a fluid introducing conduit located at the normal head gasket location for the cylinder so that the combustion of the gaseous fuel in the cylinder occurs initially at a point separated from the location where the heat vaporizable fluid is introduced into the combustion chamber. In addition to introduction of heat vaporizable fluid through one or more "atomizing-type" spray nozzles or orifices on the interior surface of the combination fluid introducing and gasket device, another embodiment of the device introduces the heat vaporizable fluid by accumulating the fluid on its interior surface by permeating this fluid through porous elements which comprise the surface of the device on the inside of the combustion chamber. The volume of material inside the combustion chamber may be selected on each combination fluid introducing gasket device to increase, decrease or maintain the same cylinder compression ratio when the device is installed to modify an existing engine. The configuration and surface area of the porous surface of the device may be selected to achieve the optimum vaporization of vaporizable fluid consistent with physical parameters and operational torque and revolution per minute requirements of the services in which the engine being modified is utilized.

A further objective of the invention is the method of process of providing heat vaporizable fluid during the compression portion of an internal combustion engine cycle for purposes of reducing the amount of Nitrous Oxide $NO_x$ pollutants produced during the combustion portion of the cycle. The method or process includes providing heat vaporizable liquid during the combustion portion of an internal combustion engine cycle to reduce amount of Nixtrous Oxide ($NO_x$) pollutants produced during combustion cycle. These processes are combined with processes for stratifying, segregating and/or separating a remaining portion of heat vaporizable liquid from the combustion process, making this remaining portion available after combustion is substantially complete to cool the engine and thereby partially increase mean effective pressure work output and engine operating efficiency.

A further objective of the invention is to provide a porous surface area element located in the combustion cylinder that will receive and hold vaporizable liquid droplets, that may be introduced into the engine cylinder along with air or fuel air mixture, until combustion is substantially completed, at which time the porous surface element, part, will allow the heat of combustion energy to vaporize the "held" liquid to cool the engine and increase internal cylinder mean effective pressure on the power stroke.

A further object of the invention is to control the introduction of heat vaporizable liquid into the cylinder of an engine in accordance with the exhaust temperature of the engine.

A further object of the invention is to control the introduction of vaporizable liquid into the cylinders of an engine in accordance to the temperature at one or more locations on the assembled engine components.

A further objective of the invention is to control the introduction of the vaporizable liquid in accordance with temperature of the cooling medium of an auxiliary engine cooling system.

A further object of the invention is to control the introduction of vaporization liquid in accordance with either or both or any combination of the temperature of the exhaust, the assembled engine parts, the auxiliary cooling system cooling medium.

Still another object of the invention is to supply vaporizable fluid to a cylinder of an engine derived from fluid recovered by utilizing the location of the normal cooling radiator system of the engine to install a combination air cooled condenser-reboiler with a separator and a second air-cooled condenser to condense to liquid state the liquid's vapor, such as steam, leaving the internal combustion engine in the exhause system.

Other objects of this invention will appear from the following description and appended claims, reference being had to the accompanying drawings, forming a part of this specification wherein like reference characters designate corresponding parts in the several views.

BRIEF DESCRIPTION OF THE DRAWINGS

FIG. 7 is a plan view of a cylinder provided with a heat vaporizable liquid such as water introducing device and gasket with porous extended surface on interior of cylinder accordance with a third embodiment of the invention;

FIG. 8 is an enlarged cross-sectional view taken along line 8—8 of FIG. 7 showing a gasket device included in the cylinder of FIG. 7;

FIG. 9 is a vertical cross-sectional view of the cylinder of FIG. 7 further illustrating the gasket device for introducing vaporizable fluid into the cylinder;

FIG. 10 is a view similar to FIG. 8 showing the path of vaporizable fluid in the porous extended interior surface gasket device;

FIG. 11 is a schematic view showing four cylinders provided with gasket devices and a vaporizable fluid supply system therefor. The vaporizable fluid system in FIG. 11 includes a means for controlling the quantity of vaporizable fluid introduced into the cylinder based on maintaining engine exhaust temperature within adjustable limits. When water is the vaporizable fluid that is introduced, exhaust gas temperatures between 250° and 1250 degrees F. will be indicative of maximum efficiency improvement from vaporizing the liquid water to gaseous steam, depending on engine RPM and load variations. When engine exhaust is discharging into atmospheric pressure, the quantity of vaporizable fluid that will permeate through the porous surface of the fluid introducing gasket device will depend on the mean effective pressure differential between the pressure of the vaporizable fluid being pumpted into the gasket device and the mean effective pressure inside the engine cylinder and the time internal between sequential combustion cycles in a cylinder. In order to accomodate both of these additive effects a great pressure range is necessary in the control of the supply pressure of the vaporizable liquid.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Figures 1, 2, 3:
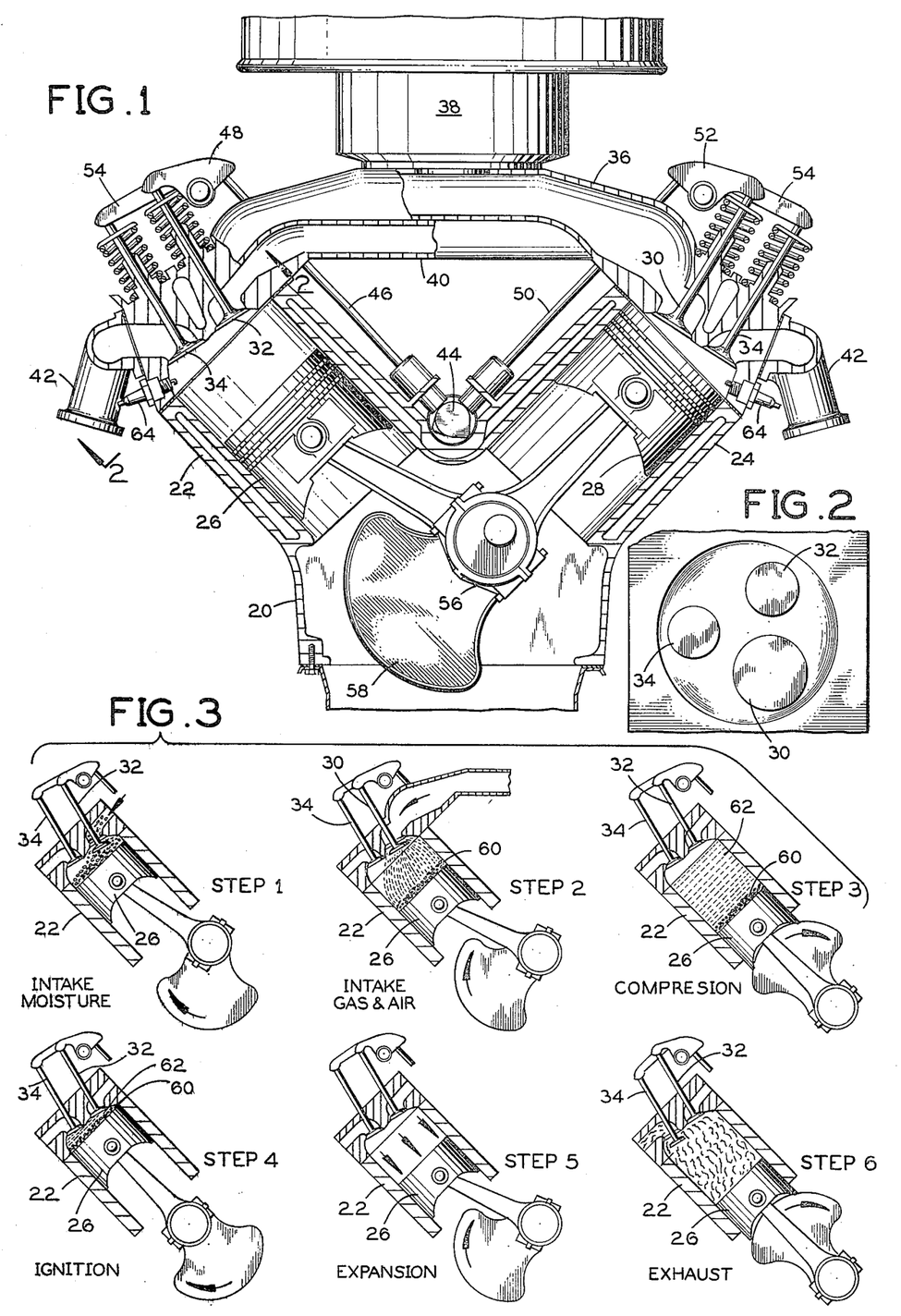
FIG. 1 is an elevational view, partly in section, showing two cylinders of an internal combustion engine provided with water vapor introduction means in accordance with one embodiment of the invention.
FIG. 2 is a fragmentary view taken along lines 2—2 of FIG. 1 showing three inlet valves for the cylinder of the engine of FIG. 1.
FIG. 3 is a series of views showing different stages of the four cycles of the engine of FIG. 1.

Referring first to FIGS. 1 through 3, the engine 20 is a four cycle internal combustion engine having a plurality of piston and cylinder devices, two of which are visible in FIG. 1. Each of the cylinders 22 and 24 has intake, compression, expansion and exhaust strokes of the pistons 26 and 28. As shown in FIG. 2, each of the cylinders has an intake valve 30 for introducing a fuel mixture to the cylinder. Another intake valve 32 for introducing heat vaporizable liquid fog into the cylinder, and an exhaust valve 34 for exhausting spent gases from the cylinder. The section for cylinder 22 is taken through the moisture intake valve 32 and the exhaust valve 34. The section for cylinder 24 in FIG. 1 is taken through the fuel mixture intake valve 30 and the exhaust valve 34.

A fuel mixture intake manifold 36 leads from the carburetor 38 to the fuel mixture intake valves 30. A heat evaporable fluid-air mixture (fog) manifold 40 leads from the carburetor 38 to the fog intake valves 32 for supplying heat evaporable fluid-air mixture fog through the fog intake valves into the cylinder. Fittings 42 lead from the exhaust valves 34 to the exhaust manifold (not shown).

A cam shaft 44 is coupled by a connecting rod 46 and a lifter 48 to the fog intake valve 32. The cam shaft 44 is coupled by a rod 50 and a lifter 52 to the fuel moisture intake valve 30. The cam shaft 44 is coupled by similar rods and lifter 54 to the exhaust valves 34. The pistons 26 and 28 are coupled by connecting rods to a crank shaft 56 with a fly wheel 58 in the usual manner.

The cam lobe profile for the fog intake valves 32 are constructed to open and close the fog intake valves before the opening and closing of the fuel mixture intake in each cylinder 30. This operation is illustrated in FIG. 3. In step one, the intake stroke of the piston 26 is the beginning, and the fog intake valve 32 is open for introducing heat evaporable fluid-air fog mixture into the cylinder 22 while the exhaust valve 34 and the fuel mixture intake valve 30 (not shown) are closed. The fog locates adjacent to the surface of the piston 26 after it has descended part-way in the intake stroke, and the layer 60 represents a layer of heat evaporable fluid-air mixture fog which is stratified next to the surface of the piston 26. The fuel mixture intake valve 30 is open for introducing a fuel-air mixture into the cylinder 22 after the evaporable liquid fog 60 has been introduced during the intake stroke of the piston 26. The exhaust valve 34 remains closed.

Step three illustrates the compression stroke of the piston 26 with all of the valves closed. The evaporable fluid fog-air mixture 60 remains stratified at the top of the piston and the fuel mixture 62 is stratified above the evaporable fluid fog.

Step four illustrates the ignition of the fuel mixture in the cylinder 22 by firing the spark plug 64 which is located at the top of the cylinder 22 as shown in FIG. 1. Note that the fuel mixture 62 is still stratified above the evaporable fluid fog 60 so that ignition begins in the stratified fuel-oxidizing agent such as air mixture at the top of the cylinder and proceeds through the fuel-oxidizing agent such as air mixture before the flame front comes into contact with the evaporable fluid fog. During the expansion or power stroke (step five) the hot burned products of combustion gases mix with the evaporable fluid fog for causing some of the heat of combustion to be absorbed in the evaporable liquid fog. This absorbtion of heat energy from the combustion process by the evaporable fluid changes the state from liquid to gas, such as water to steam. This increases the power output of the engine and consequently improves the fuel utilization efficiency. In an internal combustion engine powered vehicle, this would improve fuel miles per unit quantity, such as gallon, consumed. Step six shows the exhaust stroke of the piston 26 with the exhaust valve 34 open and the intake valves closed.

Thus, the evaporable fluid fog-air mixture is introduced into the cylinder 22 prior to the introduction of the fuel mixture so that the fog is stratified in the cylinder next to the top surface of the piston and the fuel mixture is stratified above the evaporable liquid fog-air mixtures. Consequently, the combustion flame front proceeds through the fuel mixture into contact with the evaporable liquid fog after most of the combustion has taken place without mixing substantial amounts of evaporated liquid vapor or fog with the fuel mixture. This avoids excessive reduction of combustion temperatures and avoids interruption or interface with combustion.

Figure 4:
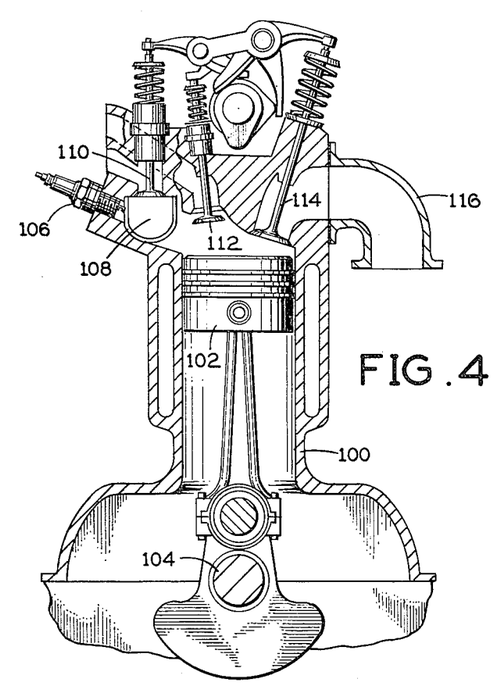
FIG. 4 is a vertical sectional view of a cylinder of an engine provided with a heat vaporizable liquid-air mixture, such as water-air, fog, introduction device in accordance with another embodiment of the invention.
Figure 5:
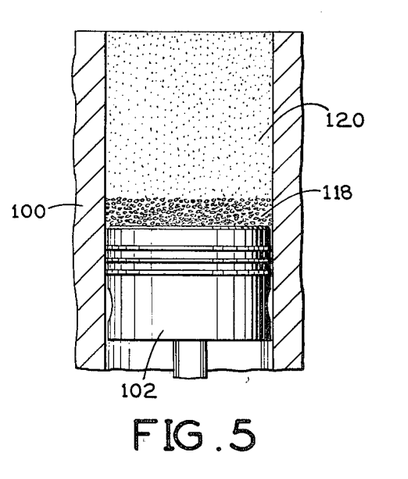
FIG. 5 is an enlarged fragmentary schematic view of the cylinder of FIG. 4.
Figure 6:
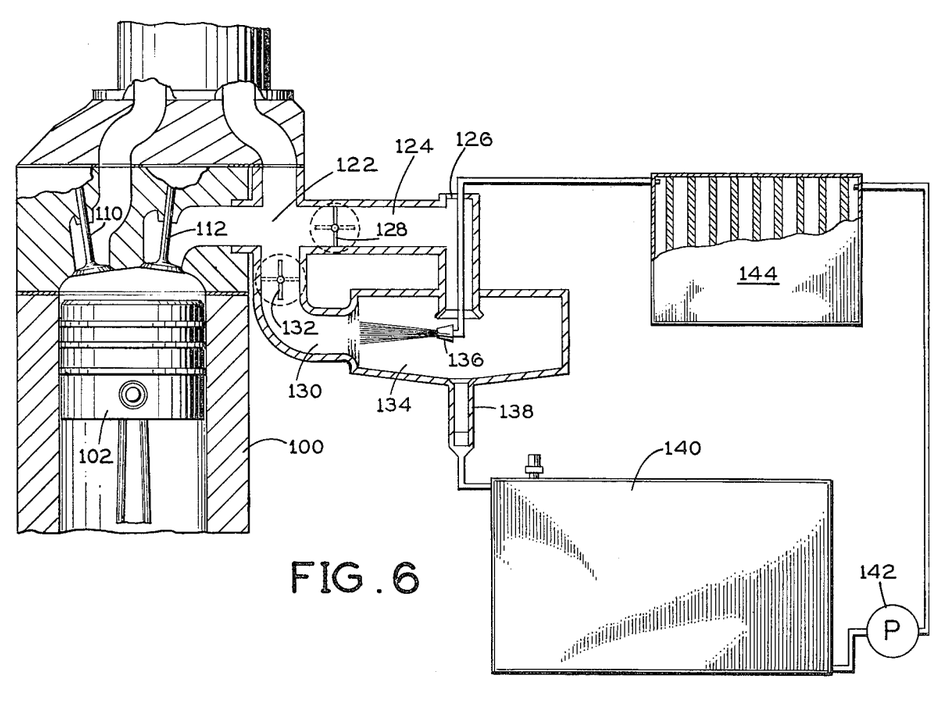
FIG. 6 is a schematic view similar to FIG. 4 showing a temperature controlled apparatus for introducing heat vaporizable liquid-air mixture such as water fog into the cylinder.

FIGS. 4 through 6 illustrate another embodiment of the invention. The cylinder 100 of a four cycle internal combustion engine has a piston 102 coupled to a crankshaft in the usual manner. Each cylinder is provided with a spark plug 106 near its top, and the spark plug 106 is located in an extension 108 of the cylinder proceeding away from the cylinder. A fuel intake valve 110 leads into the cylinder extension 108 for introducing a gaseous fuel-oxidizing agent such as air mixture of relatively rich proportions into the cylinder extension. An evaporable liquid-fog air mixture intake valve 112 is located below and near the cylinder extension 108 just above the piston 102 when it is at the top of its stroke. An exhaust valve 114 is located at the top of the cylinder communicating with an exhause fitting 16.

A mixture of lean fuel and evaporable liquid fog is introduced into the cylinder 100 through the moisture intake valve 112 to produce a stratified layer of moisture and lean fuel on top of the piston at 118 in the manner shown in FIG. 5. A richer fuel mixture is introduced into the extension 108 through the inlet valve 110 so that the richer fuel mixture is stratified separate from the lean fuel-air-evaporable liquid fog. This introduction of rich fuel mixture and fog mixed with lean fuel occurs during the intake stroke of the piston 102. As the piston 102 proceeds in the intake stroke in the manner shown in FIG. 5, the lean fuel-fog layer 118 becomes stratified on top of the piston 102 with a richer fuel mixture at 120 above the lean fuel-fog layer.

Toward the end of the compression stroke of the piston 102, ignition occurs, and the combustion flame front proceeds through the richer fuel mixture into the lean fuel-air-fog in the layer 118 for causing some of the heat produced by combustion to be transferred to the evaporable liquid in accordance with the previous description. The evaporable liquid fog is mixed with lean fuel so that combustion occurs in a layer 118 at a lower temperature. This avoids mixing of evaporable liquid fog with the richer gas mixture in layer 120 to increase the ignition temperature to produce more efficient operation of the engine.

FIG. 6 is a schematic view of the cylinder 100 and the piston 102 showing the rich fuel oxidizing agent such as air mixture intake valve 110 and the fog-air mixture intake valve 112 together with a system for introducing evaporable liquid fog-air mixture through the valve 112. There is a first passage 122 for introducing lean fuel-oxidizing agent such as air mixture from a source (not shown) into the cylinder 100 through the valve 112.

A second passage 124 having an air inlet 126 leads through a heat sensitive valve 128 to the first passage 122 for mixing air quantity with the gaseous fuel in the passage 122 so as to achieve a lean mixture. A third passage 130 communicates with the first passage 122 through the heat sensitive valve 132 for mixing evaporable liquid fog-air mixture with the lean gaseous fuel-air mixture in the passage 122. The passage 130 includes a chamber 134 into which evaporated fluid is sprayed through an "atomizing type" spray head 136 for creating minute fluid particle fog into the air into the passage 130 to provide evaporable liquid fog-air mixture in the passage 130. Excess water drains through a drain 138 to a water source 140 which could be the radiator in which the engine is provided. A pump 142 pumps water through a filter 144 to the spray head 136.

The first heat sensitive valve 128 serves to control the flow of air from the passage 124 to the passage 122. The second heat sensitive valve 132 serves to control the flow of evaporable liquid fog-air mixture from the passage 130 to the passage 122. The first heat sensitive valve 128 tends to close with increasing temperature, and the second heat sensitive valve 132 tends to open with increasing temperature. The valves 128 and 132 may be thermostatically controlled by thermostats provided in the exhaust system of the vehicle so that they are sensitive to exhaust temperatures. Thus, at temperatures above a threshold value (say 250 degrees F. by way of example, the valve 128 will be closed and valve 132 will be open for introducing evaporable fluid fog-air mixture with the fuel-air mixture resulting overall in a lean fuel-air mixture resulting overall in a lean fuel-air-fog mixture into the cylinder in the manner described in connection with FIG. 4. At temperatures near the threshold value, both valves 128 and 132 will be open for introducing both fog and air with the fuel into the cylinder. At temperatures below the threshold value, the valve 132 will be closed and the valve 128 will be open to introduce air with the fuel in a lean mixture into the cylinder 100. These valves may be controlled separately by independent thermostats or may be linked and controlled together by a single thermostatic device. Operating set points may be reset automatically with changes in engine speed and load.

FIGS. 7 through 11 illustrate a third embodiment of the invention which is presently preferred. In this embodiment, suitable for both two or four cycle internal combustion engines, a cylinder 200 shown for a four cycle internal combustion engine, has a piston 202 connected to a crankshaft in the usual manner. The cylinder has a spark plug 204 near the top or the top-side of the cylinder for igniting the fuel mixture in the cylinder. There is a fuel mixture intake valve 206 and an exhaust valve 208 which are operated in the usual manner.

Figures 7, 8, 9, 10, 11:
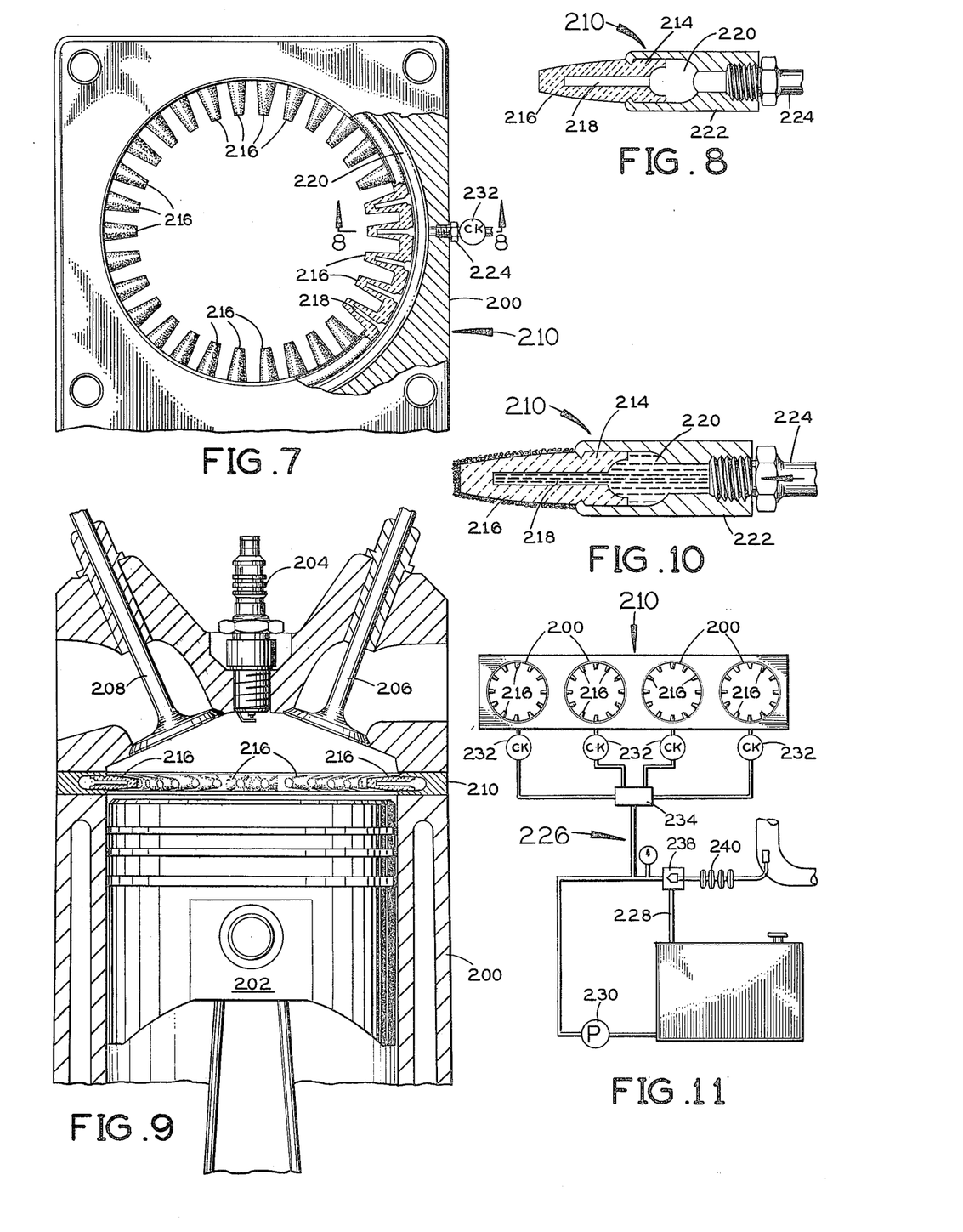

Evaporable liquid such as water is introduced into the cylinder 200 through a gasket device 210, one possible internal construction of which is illustrated in FIGS. 8 and 10. The gasket device 210 includes a porous ring 214 which may be of sintered metal or ceramic material. The ring may have simple surface contours or may have shaped or extended surface contours such as the plurality of inwardly directed projections shown for piece 216 which are exposed at the inner face of the cylinder in the manner illustrated in FIG. 7. Each projection 216 has a hollow space 218 in the interior thereof. The hollow space 218 communicates with an evaporated liquid source 220 inside jacket 222. The evaporable liquid source 220 communicates through a line 224 to the evaporable liquid storage tank 226 which can be replenished from exterior source and from engine exhaust cooling condenser with liquid separating and purifying system. Supply tank 226 supplies evaporable liquid to the evaporable fluid source 220 in the manner illustrated in FIG. 10.

In FIG. 11, there are four cylinders 200, each provided with a gasket device in accordance with the previous description. The gaskets are coupled to the evaporable liquid storage 226 and recovery system. Evaporable liquid is pumped through a pump 230 to the gaskets through check valves 232 after the evaporable liquid has been distribed to the cylinders through the distribution manifold 234. Liquid is returned to the radiator through line 228. Pressure is controlled by a valve 238 which is sensitive to exhaust pressure through bellows 240.

The evaporable liquid in the fluid source 220 wets the porous sintered metal or ceramic ring 214 and the projections 216 so that the surfaces of the projections 216 which are exposed inside the cylinder 200 will serve as a source for evaporating fluid. Since the spark plug 204 is located above the gasket 210 in the cylinder 200, and is spaced and separated from that gasket, combustion will proceed from the spark plug to the gasket so that the fuel mixture will be mostly combusted before it comes into contact with the evaporable liquid which evaporates from the surfaces of the shaped surface porous ring 216. The heat of combustion will tend to vaporize the fluid from the surface and porous openings near the surface and heat will be absorbed both by the vaporization process and by the vapor produced thereby after initial combustion occurs. The check valves 232 are oriented to prevent the pressure of combustion from backing fluid up in the evaporating liquid recovery, storage and supply system 226. Thus evaporable liquid is introduced into the cylinder 200 in a manner such that the heat energy developed by the combusting fuel gases and existing as increase in temperatures of these gases contacts the evaporable liquid after the combustion of the fuel gases is nearly complete, causing heat energy to be absorbed by the evaporable liquid causing it to evaporate from the surface and pores of the porous shaped surface 214 and further heat the evaporated liquid's vapor to a super heated status. The absorption of heat into the evaporable liquid and its consequent change of state from liquid to vapor gas, results in a great increase in volume. For water, which is an evaporable liquid, the expansion in volume approaches a magnitude of 100. This great expansion in volume is achieved by reducing the temperature in the cylinder. The temperature reduction tends to reduce pressure in the cylinder; however, the great expansion in volume of the evaporable fluid increases the pressure more than the temperature reduction reduces the pressure, so that the cylinder pressure actually increases, resulting in the power output of the engine being increased and fuel efficiency improved. In a vehicle this means more miles per gallon of fuel consumed. The lowering of the cylinder temperature reduces the energy losses that now are lost through the engine cooling system.

Figures 12, 13:
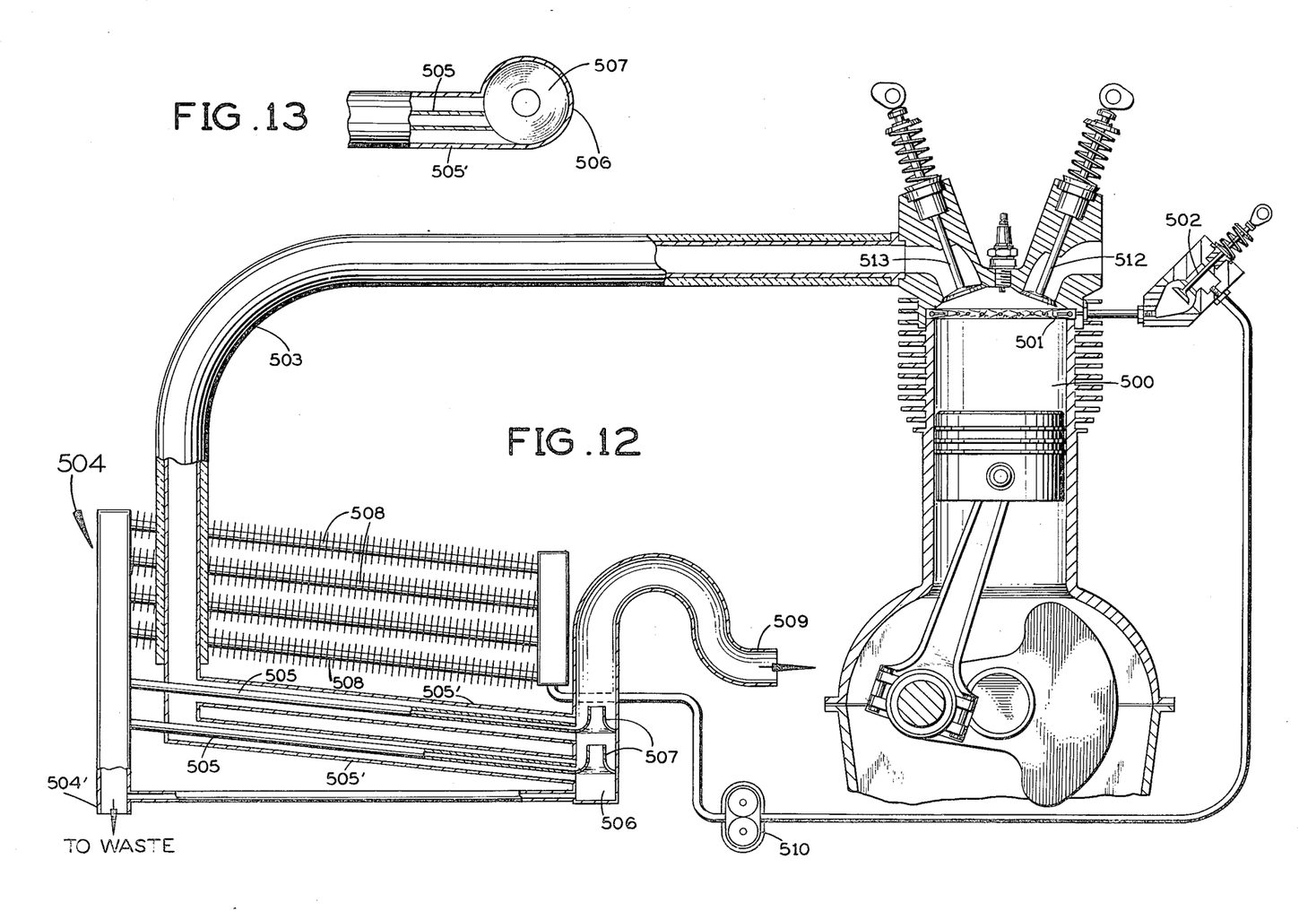
FIG. 12 is a schematic view of a system for separating liquid from exhaust gases and returning them to a liquid-fog injection system for an engine.
FIG. 13 is a schematic view of a separator in the system of FIG. 12.

A gasket device which is located between upper and lower cylinder members could be used to introduce evaporable liquid in other ways. An example is shown in FIGS. 12 and 13. Liquid-fog injectors 501 in such a gasket device are located at the normal head gasket location of a cylinder 500 having intake and exhaust valves 512 and 513. Timed valves 502 for the injectors 501 are mechanically coupled to the engine crankshaft so that injection pulses of evaporable liquid are sprayed as fog into cylinder 500 by injectors 501. The valves 502 are fed by pump 510. The fog goes into the cylinder ahead of the fuel air mixture and is stratified adjacent the surface of the piston in accordance with the previous description. The fuel-air mixture is then introduced through the intake valve 512 and is stratified separate from the liquid-air fog. After combustion, the fog is evaporated and is exhausted from the cylinder through the exhaust valve 513. The exhaust gases containing evaporated liquid pass through an insulated conduit 503 to slanting conduits 505' of system 504. The conduits extend outside inner conduits 505 which contain condensed liquid and so cool the gases in conduits 505'. Liquid condenses out of these gases and emerges with uncondensed gases at separator 506. The liquid-gas mixture enters separator 506 tangentially as shown in FIG. 13 and so swirls upward through a converging throat 507. The heavier liquid goes to the outside of throat 507 and spills over its mouth, then falling back down to enter inner conduits 505. The gases emerge at 509. The liquid rises in the upwardly slanting conduits 505 and at about a midway point thereof the liquid boils, producing vapor again. The vapor containing some entrained liquid, goes to the left, and the entrained liquid containing pollutants falls out to waste at 504'. The vapor passes through air cooled conduit 508, and condenses to liquid again. This purified liquid is pumped by pump 510 to storage (not shown) and goes from there back to the injectors 501.

Figures 14, 15, 16:
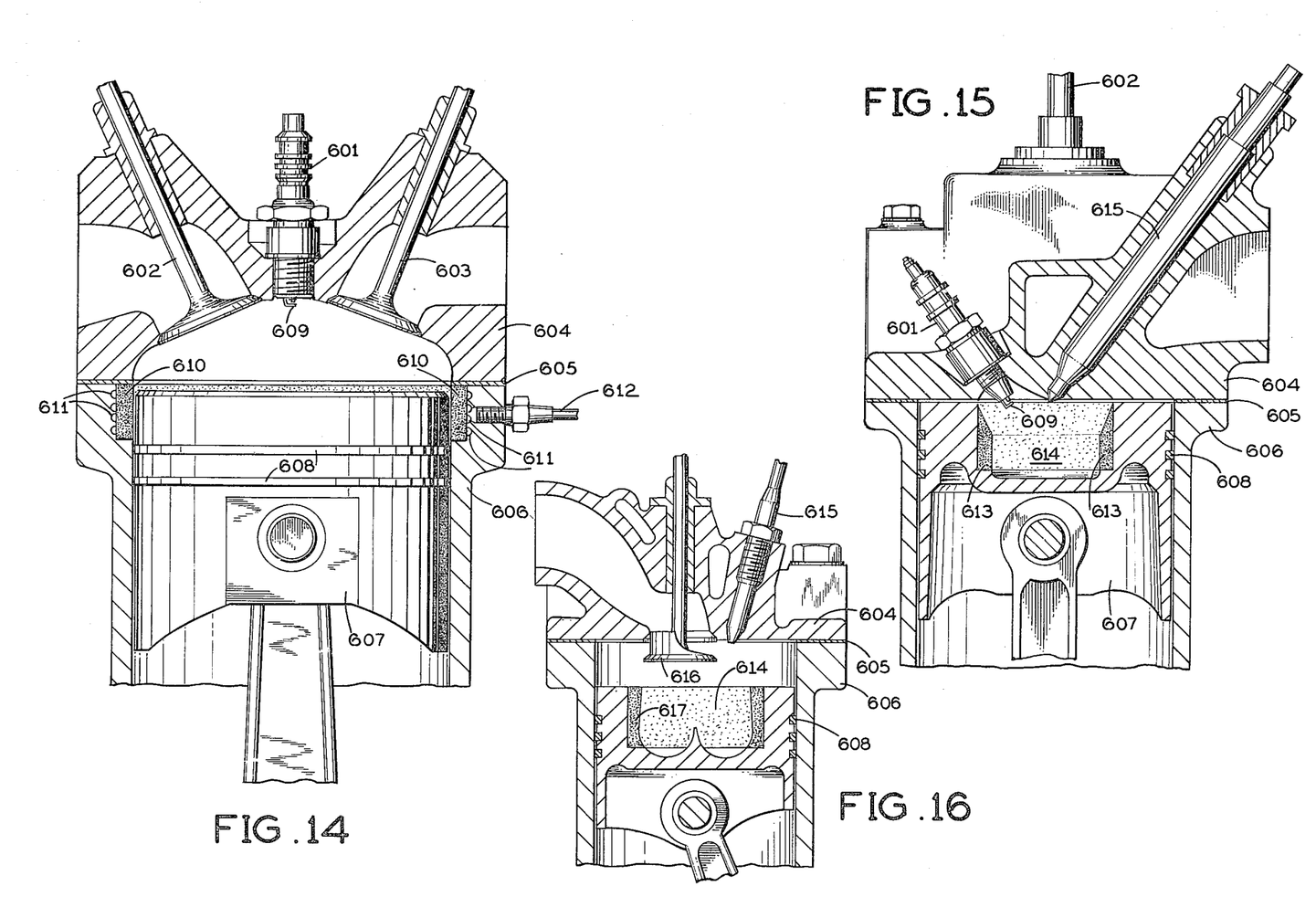
FIG. 14 is similar view of cylinder of an engine as FIG. 9, with upper portion of the cylinder wall being a heat vaporizable fluid introducing surface, with piston designed so its rings will not move over this surface, and the top of the piston being interposed, to a major extent, between this liquid introducing surface, and space where combustion occurs, for most of the combustion phase of the internal combustion engine cycle.
FIG. 15 is a sectional view through cylinder and piston of a PROCO, Programmed Combustion Process, open chamber stratified charge engine showing a porous liner installed around periphery of the open combustion chamber to catch and hold centrifugally deposited vaporizable liquid during last of compression phase and combustion phase and release this liquid when heat energy of combustion vaporizes the liquid.
FIG. 16 is a view similar to FIG. 15 through a Texaco Controlled Combustion System (T.C.C.S.) Engine showing a porous liner installed around periphery of the open combustion chamber. In this embodiment, the porous liner's interior surface is shaped so that combustion chamber is larger toward its bottom so that the centrifugal separation of evaproable liquid will tend to occur in the lower portion of the combustion chamber.

FIG. 14 shows an embodiment for introducing evaporable liquid through a porous element which is recessed in the cylinder wall at the head gasket location. FIG. 15 is similar to FIG. 9. A cylinder 606 has a piston 607 connected to a crankshaft in the usual manner. The cylinder has a spark plug 601 near the top of the cylinder for igniting the fuel mixture in the cylinder. There is a fuel mixture intake valve 603 and an exhaust valve 602 which are operated in the usual manner.

The engine cylinder head 604 is attached to the cylinder block 606 and separated by a gasket 605. Just above the piston rings 608 when the piston is at top center, there is located a porous element 610 which is recessed into the cylinder wall just below the head gasket 605. Grooves 611 constituting a liquid source are formed in the cylinder wall immediately behind the porous element. A tube 612 connects the porous element and the grooves to a vaporizable liquid supply system (not shown).

The evaporable liquid from the source wets or saturates ring element 610. Since the spark plug 601 and its ignition area 609 are separated above the porous element 610, combustion will proceed from the spark plug ignition point 609 to the porous element 610 so that the fuel mixture will be mostly combusted before it comes into contact with the evaporable liquid which evaporates from the interior surface of the porous element. The heat of combustion will tend to vaporize the liquid from the surface and porous opening near the surface, and heat will be absorbed by the vaporization process and by the vapor produced thereby after initial combustion occurs. It may be seen that the piston covers and exposes the porous surface and the evaporable liquid partially evaporates during the compression phase of the cycle. The porous surface is uncovered after combustion and during the remainder of the generation of mechanical work energy to the energy output shaft.

FIG. 15 shows a modification which is a type of engine known as the P.R.O.C.O. FIG. 15 is similar to FIG. 14 and like parts are given like reference numerals. Element 613 is the porous surface which is recessed in the top of the piston just below the spark plug 601 and the fuel injector 615. Vaporizable liquid fog is introduced through an intake valve. The combustion chamber 614 is designed to cause the combustion chamber contents to swirl, and the fuel in introduced into the swirling gases just ahead of the spark plug 601. Combustion starts at 609. The vaporizable liquid fog swirls to the outside of the combustion chamber contents and deposits on the porous element 613. This vapor evaporates during combustion.

FIG. 16 shows another embodiment which is an engine of the T.C.C.S. type. Like parts are given like reference numerals in FIGS. 14, 15 and 16. The intake valve 616 is shrouded to introduce swirl into the cylinder contents. Element 617 is the porous surface recessed in the top of the piston near the bottom of the combustion chamber so that most liquid will be collected as far away from the point of initial combustion as possible.

I claim:

1. In a four or two cycle internal combustion engine having a piston and cylinder forming a combustion chamber with intake, compression, expansion and exhaust phases in its cycle, and means for introducing a combustible fuel-oxidizing agent mixture into said cylinder, means for igniting the fuel-oxidizing agent mixture in said cylinder and means for exhausting gases from said cylinder, the improvement comprising:

means for introducing evaporable liquid into said cylinder in a stratified manner such that the liquid is contacted by a portion of the combusting fuel gases primarily after most of the combustion of the fuel gases has occurred for absorbing some of the heat of combustion in the liquid and vaporizing the same;

said portion of the gases being located at the periphery of the combustion chamber at the time combustion is close to completion and the piston is commencing its power stroke, so as to provide a stratified liner, substantially in cylindrical shape, against the cylinder walls of the cooler portion of combustion gasses and evaporable liquid to reduce the energy loss to the cylinder cooling system and recoup this energy as vapor to exert pressure on the piston;

said evaporable liquid introduction means including a porous device means for said chamber including a porous portion exposed in said cylinder at a location spaced and separated from said igniting means, the remainder of said chamber being non-porous, and means communicating with said porous portion for saturating the same with evaporable liquid so that the combustion of the gaseous fuel occurs in said chamber initially at a point separated from said porous portion and proceeds into contact therewith for vaporization of liquid and absorption of heat by liquid vapor.

2. In a four or two cycle internal combustion engine having a piston and cylinder forming a combustion chamber with intake, compression, expansion and exhaust phases in its cycle, and means for introducing a combustible fuel-oxidizing agent mixture into said cylinder, means for igniting the fuel-oxidizing agent mixture in said cylinder and means for exhausting gases from said cylinder, the improvement comprising:

means for introducing evaporable liquid into said cylinder in a stratified manner such that the liquid is contacted by the combusting fuel gases primarily after most of the combustion of the fuel gases has occurred for absorbing some of the heat of combustion in the liquid and vaporizing the same;

said evaporable liquid introduction means including a porous device means for said chamber including a porous portion exposed in said cylinder at a location spaced and separated from said igniting means, the remainder of said chamber being non-porous, and means communicating with said porous portion for saturating the same with evaporable liquid so that the combustion of the gaseous fuel occurs in said chamber initially at a point separated from said porous portion and proceeds into contact therewith for vaporization of liquid and absorption of heat by liquid vapor;

said evaporable liquid introduction means further including an evaporable liquid storage container;

means for supplying evaporable liquid under pressure from said container to said porous device means including a one-way check valve for preventing the pressure of combustion in said cylinder from reversing liquid flow;

means for returning evaporable liquid from said supply means to said container including pressure controlling means and means for adjusting said pressure controlling means in response to pressure in said exhausting means.

3. The internal combustion engine as claimed in claim 2 in which:

said porous device means comprises a porous surface ring and a jacket ring means communicating with said porous surface ring.

4. The internal combustion engine as claimed in claim 3 in which:

said porous surface ring and said jacket ring means each has a hollow interior.

5. In a four or two cycle internal combustion engine having a piston and cylinder forming a combustion chamber with intake, compression, expansion, and exhaust phases in its cycle, and means for introducing a combustible fuel-oxidizing agent mixture into said cylinder, means for igniting the fuel-oxidizing agent mixture in said cylinder and means for exhausting gases from said cylinder, the improvement comprising:

means for introducing evaporable liquid into said cylinder in a stratified manner such that during the compression and early combustion process the liquid is stratified in a manner and location such that higher temperature from combustion will not contact the liquid until most of combustion is completed thereby evaporating the liquid primarily after most of the combustion of the fuel gases has occurred for absorbing some of the heat of combustion in the liquid and recouping this energy as vapor to exert pressure on the piston;

said combustion chamber having a porous liner around the perimeter surface of the combustion chamber spaced from said igniting means with a substantial portion of said chamber closer to said igniting means being non-porous, and said porous perimeter providing a location for centrifugally separated evaporable liquid droplets to be absorbed into the porous surface by capillary action, held during most of the combustion phase of the engine cycle, and released when heat energy from combustion vaporizes the liquid located in the pores and on the surface of said porous element.

6. In a four or two cycle internal combustion engine having a piston and cylinder forming a combustion chamber with intake, compression, expansion and exhaust phases in its cycle, and means for introducing a combustible fuel-oxidizing agent mixture into said cylinder, means for igniting the fuel-oxidizing agent mixture in said cylinder and means for exhausting gases from said cylinder, the improvement comprising:

means for introducing evaporable liquid into said cylinder in a stratified manner such that the liquid is contacted by the combusting fuel gases primarily after most of the combustion of the fuel gases has occurred for absorbing some of the heat of combustion in the liquid and vaporizing the same;

said evaporable liquid introduction means including a porous device means for said chamber including a porous portion exposed in said cylinder at a location spaced and separated from said igniting means, the remainder of said chamber being non-porous, and means communicating with said porous portion for saturating the same with evaporable liquid so that the combustion of the gaseous fuel occurs in said cylinder initially at a point separated from said porous portion and proceeds into contact therewith for vaporization of liquid and absorption of heat by liquid vapor;

said engine having an evaporable liquid cooling system;

said introduction means further including means for supplying evaporable liquid under pressure from said engine cooling system to said porous device means including pump means and a one-way check valve for preventing the pressure of combustion in said cylinder from reversing liquid flow;

means for returning evaporable liquid from said supply means to said engine cooling system including a pressure controlling means and means for adjusting said pressure controlling means in response to pressure in said exhausting means.

7. The internal combustion engine as claimed in claim 6 in which:

said porous device means comprises a porous surface ring and a jacket ring means communicating with said porous surface ring.

8. The internal combustion engine as claimed in claim 7 in which:

said porous surface ring and said jacket ring means each has a hollow interior.

* * * * *